(12) United States Patent
Hui

(10) Patent No.: US 9,210,919 B2
(45) Date of Patent: Dec. 15, 2015

(54) SPINNING REEL LINE CLIP AND SPINNING REEL SPOOL USING THE SAME

(71) Applicant: Shimano Components (Malaysia) SDN. BHD., Johor, Malaysia (MY)

(72) Inventor: Chan Yik Hui, Johor (MY)

(73) Assignee: SHIMANO COMPONENTS (MALAYSIA) SDN, BHD, Johor (MY)

( * ) Notice: Subject to any disclaimer, the term of this patent is extended or adjusted under 35 U.S.C. 154(b) by 43 days.

(21) Appl. No.: 14/101,588

(22) Filed: Dec. 10, 2013

(65) Prior Publication Data

US 2014/0231569 A1    Aug. 21, 2014

(51) Int. Cl.
*A01K 89/01*    (2006.01)

(52) U.S. Cl.
CPC ............. *A01K 89/01* (2013.01); *A01K 89/0111* (2013.01)

(58) Field of Classification Search
CPC ............................... A01K 89/00; A01K 89/01
USPC .......................................... 242/323, 310, 311
See application file for complete search history.

(56) References Cited

U.S. PATENT DOCUMENTS

| | | | | |
|---|---|---|---|---|
| 2,791,054 A | * | 5/1957 | Gronek | 43/25.2 |
| 3,164,334 A | * | 1/1965 | Gris | 242/323 |
| 4,883,238 A | * | 11/1989 | Harder | 242/317 |
| 4,892,267 A | * | 1/1990 | Webb | 242/228 |
| 5,263,276 A | * | 11/1993 | Washington | 43/25.2 |
| 5,318,247 A | * | 6/1994 | Sugawara | 242/319 |
| 5,449,128 A | * | 9/1995 | Crisci, Jr. | 242/580 |
| 5,911,378 A | * | 6/1999 | Plestan | 242/322 |
| 2003/0213862 A1 | * | 11/2003 | Perrin | 242/322 |

FOREIGN PATENT DOCUMENTS

| | | | | |
|---|---|---|---|---|
| EP | 1588614 A2 | * | 10/2005 | |
| EP | 2198706 A1 | * | 6/2010 | A01K 89/01 |
| GB | 2454519 A | * | 5/2009 | A01K 89/01 |
| JP | 2010-273626 A | | 12/2010 | |

* cited by examiner

*Primary Examiner* — Emmanuel M Marcelo

(74) *Attorney, Agent, or Firm* — Global IP Counselors

(57) ABSTRACT

A spinning reel line clip includes an attachment portion and a clip body. The attachment portion is configured to be attached to a spool of a spinning reel. The clip body is provided for clipping a fishing line. The clip body is attached to the attachment portion. The clip body includes a line guide portion and a bulged portion. The line guide portion is formed on at least a part of a first surface of an outer circumferential part of the clip body. The first surface is opposed to the spool. The bulged portion is formed on at least a part of a second surface of the outer circumferential part. The bulged portion is opposed to the line guide portion. The second surface is oppositely disposed relative to the first surface.

14 Claims, 4 Drawing Sheets

SPINNING REEL LINE CLIP AND SPINNING REEL SPOOL USING THE SAME

CROSS-REFERENCE TO RELATED APPLICATIONS

This application claims priority under 35 U.S.C. §119 to Japanese Patent Application No. 2013-02865, filed Feb. 18, 2013. The entire disclosure of Japanese Patent Application No. 2013-02865 is hereby incorporated herein by reference.

BACKGROUND

1. Field of the Invention

This invention generally relates to a line clip for a spinning-reel and a spool using the same for the spinning-reel.

2. Background Information

A spool for a spinning reel reciprocates back and forth according to the rotation of a handle. A spinning reel has a bobbin trunk, a front flange, and a skirt. A line clip for clipping the fishing line that is wound to the bobbin trunk is attached to the skirt. This type of line clip clips to the end part of a fishing line that is wound on the bobbin trunk and functions to maintain a state in which the fishing line is wound to the bobbin trunk. See for example, the spinning reel line clip that is disclosed in Japanese Laid Open Patent Application 2010-273626.

The line clip has, for example, a synthetic resin clip body and a plate-like attaching part that is integrally formed with the clip body. The clip body is housed, for example, in a recess that is tinned on the front outer peripheral surface of the skirt, is exposed along the outer peripheral surface, and is placed to open to the rear side with a small space between the clip body and the skirt. A line guide portion for guiding a fishing line is formed on the end lower surface of the opening side of the clip body. A lower surface slanted part that curves and slopes to gradually face upward near the tip is formed on the line guide portion, and an upper surface slanted part that curves and slants towards the line guide portion is formed on the upper surface of the clip body. The tip of the boundary portion where the lower surface slanted part and the upper surface slanted part intersect is rounded. The boundary portion is formed in a roughly central part of the thickness of the clip body.

SUMMARY

A spool for a spinning reel reciprocates back and forth according to the rotation of the handle. A spinning reel has a bobbin trunk, a front flange, and a skirt. A line dip for clipping the fishing line that is wound to the bobbin trunk is attached to the skirt.

In a well-known line clip for a spinning reel, a boundary portion between a slanted portion and a line guide portion is formed in a roughly center part of the line clip in a thickness direction. Therefore, it is less easy to insert a fishing line into the line guide portion. Especially in using a relatively thick fishing line, it becomes very difficult to insert such fishing line into the line guide portion. In view of this, as described in Japanese Laid Open Patent Application 2010-142220, an arrangement can be assumed that the boundary portion is slightly shifted radially outwards from the center part. However, when the boundary portion is shifted radially outwards, a line clip tip portion, on which the boundary portion is formed, is inevitably formed with a small thickness. When the thickness of the line clip tip portion is reduced, the line clip tends to be plastically deformed and cannot reliably hold the fishing line. When the entire thickness of the line clip is increased for avoiding the drawback, the line clip becomes less easily plastically deformed in clipping the fishing line and cannot reliably hold the fishing line. Because of this, as described in Japanese Laid Open Patent Application 2010-142220, it is required to separately provide a spring member or provide a holding recess for holding the fishing line. Thus, a drawback of cost increase is also produced.

One object of the present invention is to provide a spinning-reel line clip for easily holding a fishing line, wherein the spinning-reel line clip resists plastic deformation while having a simple structure that can be manufactured at a relatively low cost.

In accordance with one aspect, a spinning reel line clip is provided that includes an attachment portion and a clip body. The attachment portion is configured to be attached to a spool of a spinning reel. The clip body is provided for clipping a fishing line. The clip body is attached to the attachment portion. The clip body includes a line guide portion and a bulged portion. The line guide portion is formed on at least a part of a first surface of an outer circumferential part of the clip body. The first surface is opposed to the spool. The bulged portion is formed on at least a part of a second surface of the outer circumferential part. The bulged portion is opposed to the line guide portion. The second surface is oppositely disposed relative to the first surface.

In this spinning reel line clip, since a line guide portion was installed on a first surface (the inner side surface) that faces the spool when attached to the spool to at least a part of the outer circumferential part of the clip body, and at the same time, a bulged portion was installed on a second surface (the outer side surface) on the other side, the fishing line retaining force of the line clip can be maintained while making the line guide portion large. With this, in a line clip, plastic deformation can be inhibited to make clipping the fishing line easier at a low cost and with a simple configuration.

In this spinning reel line clip, the second surface (outer surface side) can be configured to include a flat surface on at least a part thereof, and the bulged portion is formed in a shape bulged from the flat surface by a bulging deformation. With this, when the fishing line is retained, plastic deformation will not be limited to the outer circumferential part of the clip body but, rather, can be made to plastic deform more entirely, so even if a relatively thick fishing line is clipped, the retaining force can be maintained.

The outer circumferential part of the clip body is partially spherical shaped, and the line guide portion and the bulged portion are formed in at least a part of the outer circumferential part. By making the clip body roughly circular, the degree of freedom for the attachment to the spool increases. Additionally, in the case of installing the bulged portion and the line guide portion around the entire circumference of the outer circumferential part, the degree of freedom for the attachment to the spool increases further.

The outer circumferential part of the clip body can be configured to be roughly triangular, and the line guide portion and the bulged portion can be formed in at least corner vicinity of the triangularly shaped outer circumferential part. Furthermore, the corner vicinity can be rounded into a circular-arc shape. With these, since a bulged portion and a line guide portion are formed in the corner vicinity of the roughly triangular outer circumferential part, clipping becomes easy, and the retaining force can be sufficiently maintained.

The bulged portion has a length extending from an end of the outer circumferential part, and the line guide portion has a length extending from the end of the outer circumferential part that is substantially the same as the length of the bulged portion. In this case, since, in the forming of the line guide portion, a bulged portion was formed in the part that is the same and matches the part where the retaining force of the plastic deformation decreased a certain degree, the retaining force can be retained, and a relatively large line guide portion can be formed.

The bulged portion has a length extending from an end of the outer circumferential part, and the line guide portion has a length extending from the end of the outer circumferential part that is shorter than the length of the bulged portion. In this case, even in the case of using a relatively thin line, the fishing line can be retained securely regardless of the thickness of the fishing line.

The line guide portion has a slope that slants in a direction away from the spool from the first surface to the second surface. By making the line guide portion a slanted surface, the fishing line can be securely guided to the retaining position and can be manufactured easily, and plastic deformation can be easily managed.

The slope is formed by a flat surface that defines an angle in a range of 30 degrees to 40 degrees with respect to the first surface. With this, there will be a good balance between the guiding of the fishing line, the retaining force, and the thickness of the fishing line, which is convenient.

In accordance with one aspect, a spool of the spinning reel configured to forwardly release a fishing line is provided with the above mentioned spinning reel line clip. The spinning reel spool can be configured with a bobbin trunk to wind the fishing line, a front flange that is installed in the front part of the bobbin trunk, and a skirt. The skirt includes a rear flange and a tubular portion. The rear flange is disposed in opposition to the front flange. The tubular portion backwardly extends from an outer peripheral part of the rear flange. The tubular portion has an outer peripheral surface with a recess. The spinning reel line clip is attached to a bottom surface of the recess that is recessed from the outer peripheral surface of the tubular portion.

By installing a spinning reel line clip having at least a bulged portion of the present invention on the bottom surface of the recess of the skirt of the spool, a relatively thick fishing line can be retained by the bulged portion, and the effects of the bulged portion can be suppressed to a minimum.

A boundary portion of the bulged portion and the line guide portion can be disposed radially inwards from the outer peripheral surface of the tubular portion. With this, problems such as the fishing line being carelessly caught, etc., will be less likely to occur.

The boundary portion can be rounded into a circular-arc shape. With this, careless catching can be further suppressed.

The bulged portion can also have a top portion that is disposed radially outward from the outer peripheral surface of the tubular portion. In this case, even if the bulged portion is disposed radially outward from the outer peripheral surface of the tubular portion, the fishing line is not easily caught.

The spinning reel spool can be further provided with a sheet member is disposed between the first surface and the bottom surface of the recess. In this case, by using synthetic resin with high slidability for the sheet member, the guided fishing line can be smoothly disposed between the first surface and the sheet member.

According to the present invention, since a line guide portion on the first surface side that faces the spool and a bulged portion that bulges to the second surface side that is the opposite of the spool of the line guide portion are installed on at least a part of the outer peripheral part of the clip body, the fishing line can be easily inserted in the line guide portion, making the clipping of the fishing line easier; with the above, the clipping of the fishing line due to plastic deformation can be securely conducted.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
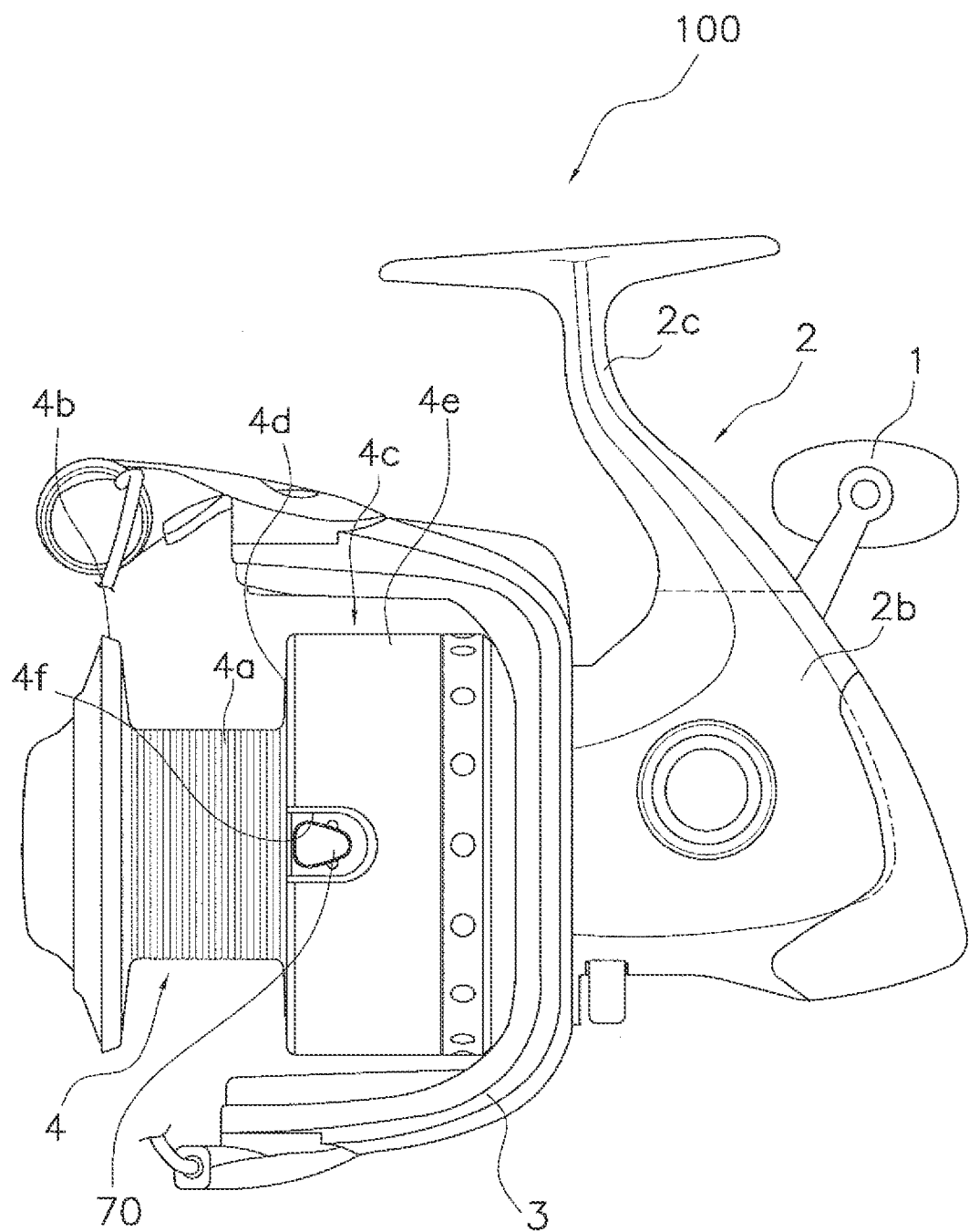
FIG. 1 is a side view of a spinning reel employing an exemplary embodiment of the present invention.

Referring initially to FIG. 1, a spinning reel 100 is illustrated that constructed in accordance with one embodiment of the present invention. The spinning reel 100 basically includes a handle 1, a reel main body 2, a rotor 3 and a spool 4. The reel main body 2 rotatably supports the handle 1. The rotor 3 is used for winding the fishing line to the spool 4. The rotor 3 is rotatably supported to the front part of the reel main body 2. The spool 4 is used to wind the fishing line to the outer peripheral surface. The spool 4 is disposed to be able to move to the front and back to the front part of the rotor 3. Furthermore, the handle 1 can be attached to either the left side or the right side of the reel main body 2.

Figure 2:
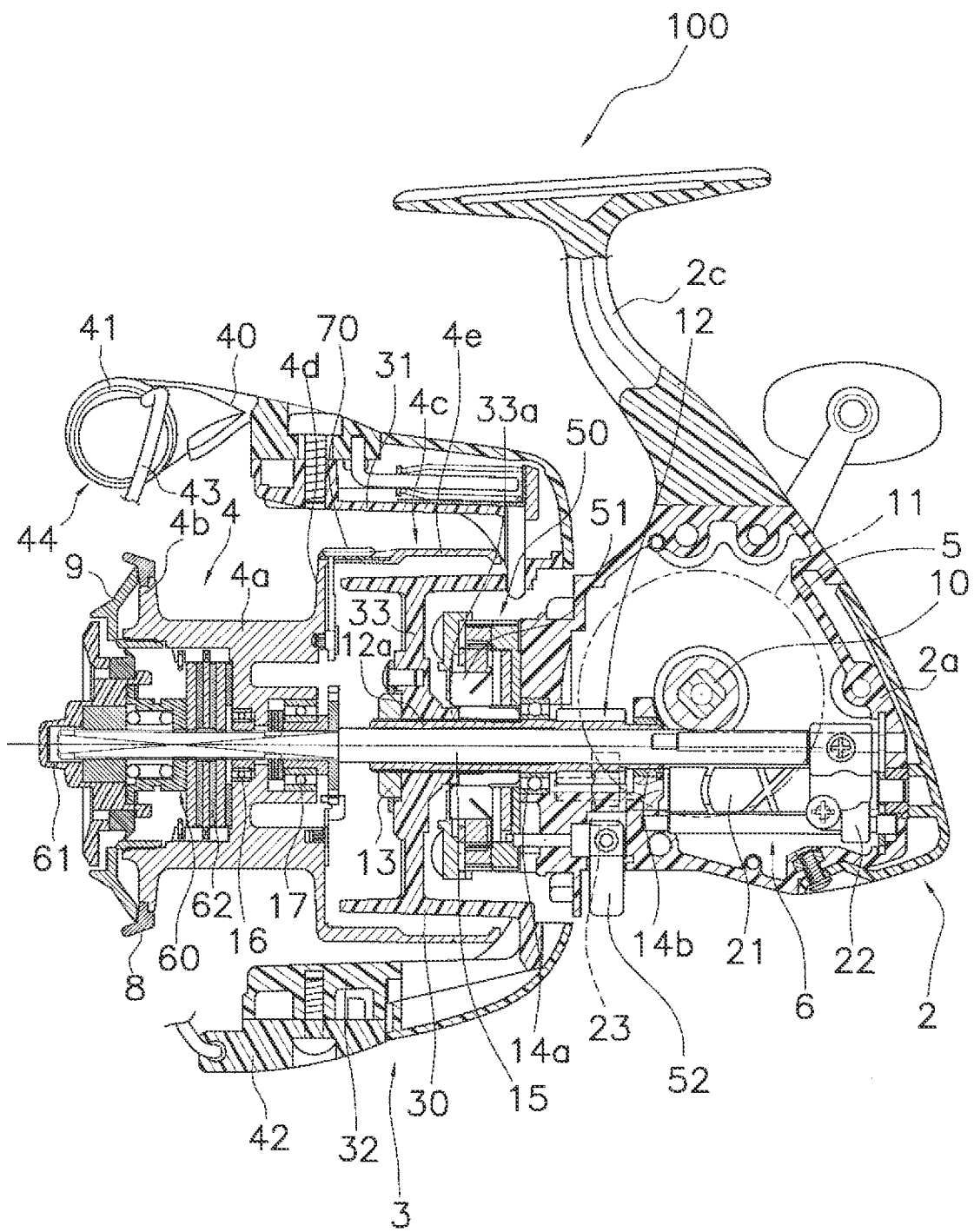
FIG. 2 is a cross-sectional side view of the spinning reel.

As shown in FIGS. 1 and 2, the reel main body 2 has a bobbin trunk 2a, a lid member 2b and a pole attaching leg 2c, The bobbin trunk 2a has an opening. The lid member 2b is detachably attached to the bobbin trunk 2a so as to plug the opening in the bobbin trunk 2a. The pole attaching leg 2c extends obliquely upward and forward from the lid member 2b. The bobbin trunk 2a has an empty space inside. Installed in this empty space are a rotor drive mechanism 5 and an oscillating mechanism 6. The rotor drive mechanism 5 rotates the rotor 3 coupled with the rotation of the handle 1. The oscillating mechanism 6 moves the spool 4 in a front and back movement for evenly winding the fishing line. As shown in FIG. 2, the rotor drive mechanism 5 has a drive gear 11 and a pinion gear 12. The drive gear 11 is fixed to the handle 1, and rotates with the drive gear axle 10. The pinion gear 12 interlocks with this drive gear 11. The pinion gear 12 is formed in a tubular shape and penetrates the center part of the rotor 3. Also, the front part 12a of the pinion gear 12 is fixed to the rotor 3 by a nut 13. The intermediate part and the rear end part of the pinion gear 12 are each rotatably fixed to the reel main body 2 via axle bearings 14a and 14b.

As shown in FIG. 2, the oscillating mechanism 6 is a mechanism for moving the spool 4 forward and backward along with a drag mechanism 60 by moving a spool axle, 15 forward and backward to penetrate the center part of the spool 4. The oscillating mechanism 6 is joined to the drag mechanism 60. The oscillating mechanism 6 has a screw shaft 21, a slider 22 and an intermediate gear 23. The screw shaft 21 is disposed parallel below the spool axle 15. The slider 22 moves forward and backward along the screw shaft 21. The intermediate gear 23 is fixed to the tip of the screw shaft 21. The slider 22 is non-rotatably fixed to the rear end of the spool axle 15. The intermediate gear 23 interlocks with the pinion gear 12 via a decelerating mechanism that is not shown in the drawing. With this decelerating mechanism, the speed of the forward and backward movement of the oscillating mechanism 6 becomes slow, so that the fishing line can be precisely wound onto the spool 4.

As shown in FIG. 2, the rotor 3 has a connecting portion 30, a first rotor arm 31 and a second rotor arm 32. The connecting portion 30 is integrally and rotatably joined to the pinion gear 12. The first rotor arm 31 and the second rotor arm 32 are installed facing each other on the sides of the connecting portion 30. The connecting portion 30, the first rotor arm 31 and the second rotor arm 32 are integrally formed as a one-piece, unitary member.

A front wall 33 is formed on the front part of the connecting portion 30. A boss part 33a is installed on the central part of this front wall 33. A through hole is formed in the center part of the boss part 33a. The front part 12a of the pinion gear 12 and the spool axle 15 penetrate this through hole. A nut 13 is disposed in the front part of the front wall 33. With this nut 13, the front part 12a of the pinion gear 12 is fixed to the rotor 3.

The first rotor arm 31 extends forward while being curved concavely outwardly from the connecting portion 30. A first bale support member 40 is attached in a manner that can slide to the outer circumferential side of the tip of the first rotor arm 31. A line roller 41 is attached to the tip of the first bale support member 40 for guiding the fishing line to the spool 4. The second rotor arm 32 extends forward while being curved concavely outwardly from the connecting portion 30. A second bale support member 42 is attached in a manner that can slide to the outer circumferential side of the tip of the second rotor arm 32. Between the line roller 41 and the second bale support member 42 is fixed a bale 43 that curves a cotton material in a roughly U shape. The first bale support member 40, the second bale support member 42, the line roller 41 and the bale 43 constitute a bale arm 44. The bale arm 44 can oscillate between a line guiding position shown in FIG. 2 and an inverted line releasing position.

A reverse rotation prevention mechanism 50 is provided that prohibits/permits the reverse rotation of the rotor 3. The reverse rotation prevention mechanism 50 is disposed inside of the connecting portion 30 of the rotor 3. The reverse rotation prevention mechanism 50 has a roller-type, one-way clutch 51 and a switching mechanism 52. The one-way clutch 51 has an inner ring that idles. The switching mechanism 52 switches the one-way clutch 51 between the operating state (the reverse rotation prohibited state) and the non-operating state (the reverse rotation permitted state).

The spool 4 is, for example, a large and small two-step tubular member that is obtained by forge forming an aluminum alloy. The spool 4 is disposed between the first rotor arm 31 and the second rotor arm 32 of the rotor 3. The spool 4 is attached to the end of the spool 15 via the drag mechanism 60. The spool 4 is rotatably attached to the spool 15 by two axle bearings 16 and 17. The spool 4 has a tubular bobbin trunk 4a to whose outer circumferential part is wound the fishing line, a front flange 4b that is integrally formed on the front part of the bobbin trunk 4a, a large-diameter tubular skirt 4c, and a line clip 70. The bobbin trunk 4a is a member that is integrally formed with the front flange 4b and the skirt 4c, and the drag mechanism 60 is attached to the bobbin trunk at the front side.

A spool ring collar 8 that has a convergently tapered surface for smoothly unreeling the fishing line when casting is attached to the outer circumferential part of the front flange 4b. The spool ring collar 8 is fixed to the front flange 4b by a fixing member 9 that is attached to the front end of the bobbin trunk 4a. The fixing member 9 is screwed to the inner perimeter surface of the bobbin trunk 4a.

Figure 3:
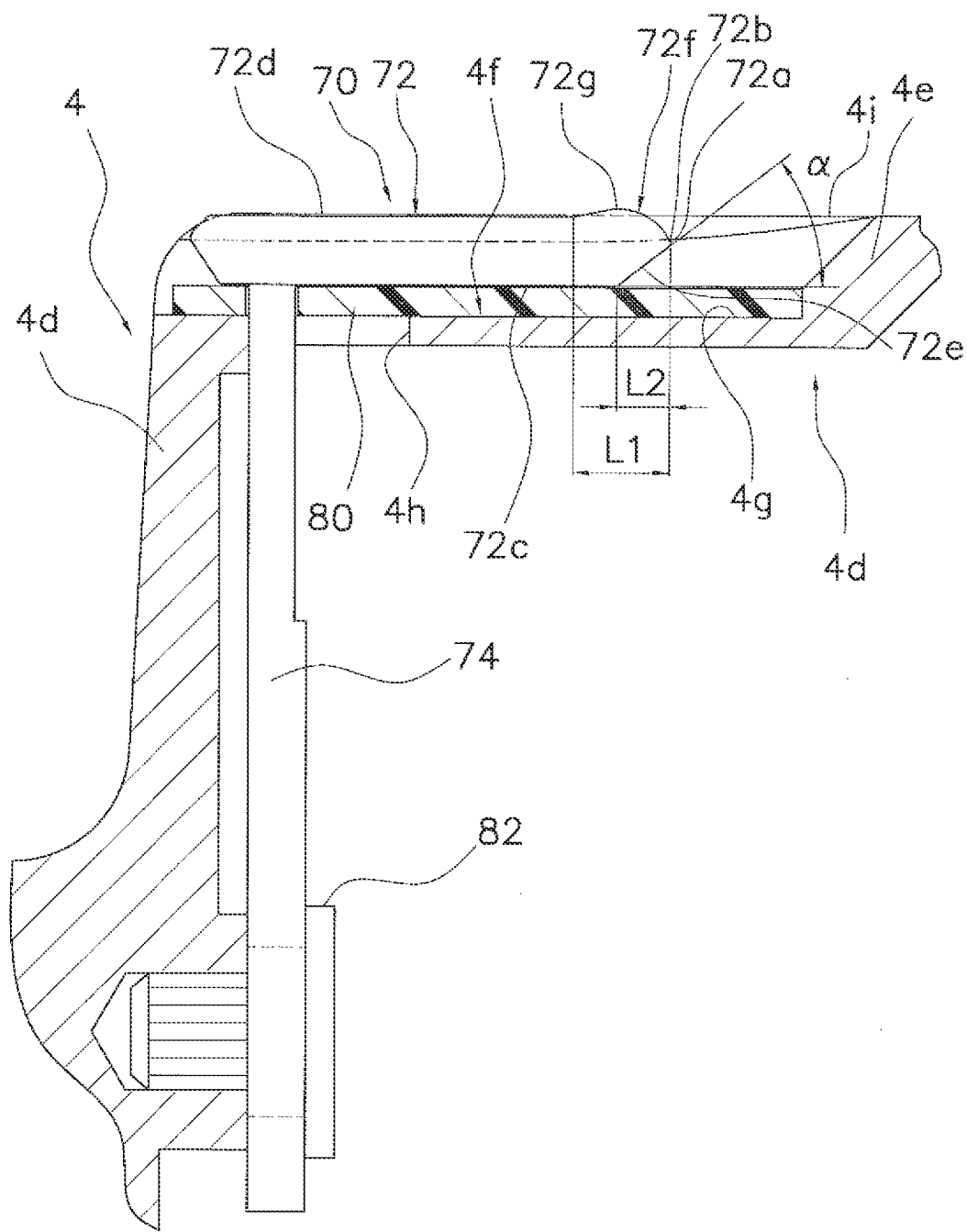
FIG. 3 is a partial cross-sectional view of a spool.
Figure 4:
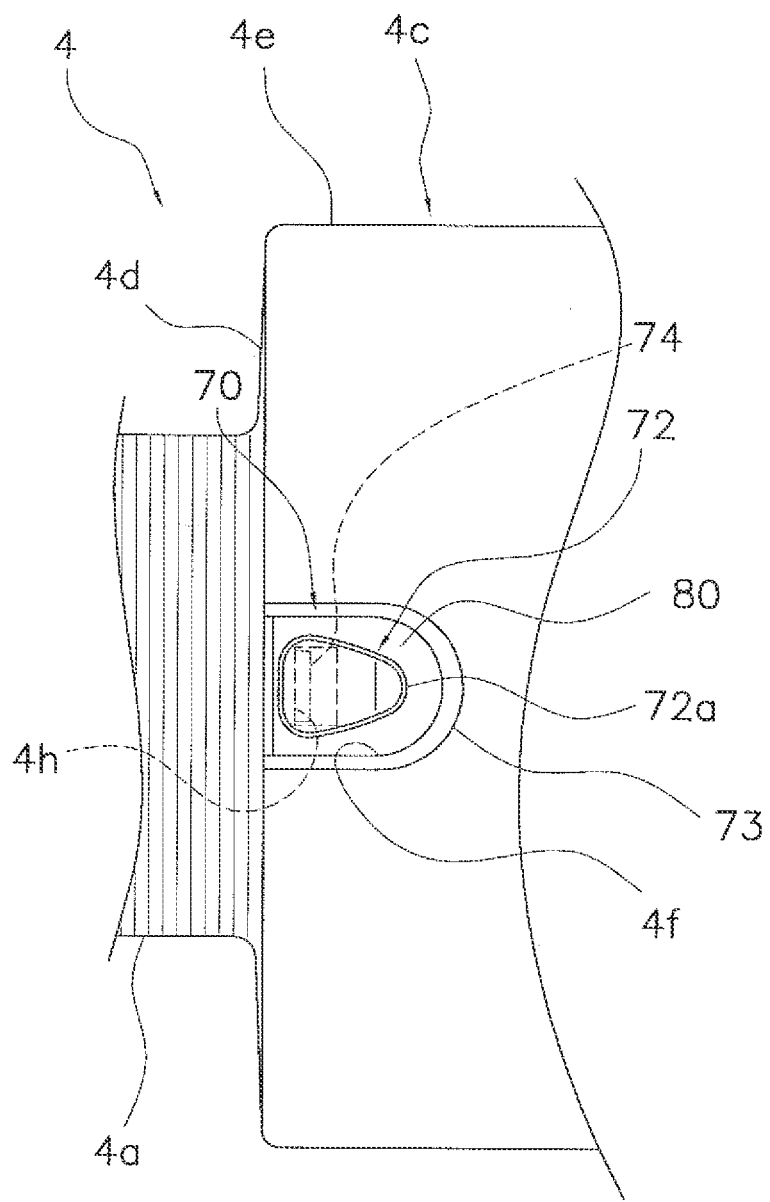
FIG. 4 is an enlarged side view of a rear part of the spool.

The skirt 4c has a rear flange 4d that is disposed facing the front flange 4b and a tubular portion 4e that is integrally formed on the outer circumferential part of the rear flange 4d. The skirt 4c is tubularly and integrally forge formed with the bobbin trunk 4a so as to cover the connecting portion 30 of the rotor 3. Additionally, as shown in FIG. 3 and FIG. 4, a recess 4f that has a flat bottom surface 4g to which the line clip 70 can be attached is formed on the outer peripheral surface of the boundary portion of the rear flange 4d and the tubular portion 4e of the skirt 4c. A rectangular through hole 4h that penetrates the tubular portion 4e and to which the line clip 70 can be attached is formed on the rear flange 4d side of the recess 4f. A plate-like sheet member 80 is attached between the first surface of the line clip 70 mentioned below and the bottom surface 4g of the recess 4f. The sheet member 80 is, for example, a synthetic resin with a high slidability, such as polyacetal, etc.

The line clip 70 as shown in FIG. 3 and FIG. 4 has a clip body 72 that is installed exposed outwardly facing the outer circumferential part of the recess 4f and an attachment portion 74 that is disposed roughly perpendicular to the clip body 72 and extends inside of the skirt 4c while penetrating the through hole 4h. The line clip 70 is a synthetic resin member with elasticity.

Regarding the clip body 72, in a planar view, the outer circumferential part 73 is the part of the roughly triangular shape whose corners are rounded. The clip body 72 clamps the fishing line between the clip body and the bottom surface 4g of the recess 4f. The clip body 72 has a tip part 72a that extends to the rear side. The tip part 72 is one example of the one end part of the outer circumferential part 73. A boundary portion 72b is formed on the tip part 72a seen from the side part. The boundary portion 72b is rounded into a circular-arc shape. Regarding the boundary portion 72b, a gap is formed between the clip body 72 and the recess 4f by picking up this tip part 72a with the fingertips. By clamping the fishing line in this gap, the fishing line is clipped by the clip body 72.

The clip body 72 as shown in FIG. 3 has a first surface 72c, a second surface 72d, a line guide portion 72e, and a bulged portion 72f. The first surface 72c is the inner side surface that faces the bottom surface 4g of the recess 4f. The second surface 72d is opposite the first surface 72c and is the outer side surface that opposes the first surface 72c. The line guide portion 72e is installed on the tip part 72a of at least a part of the first surface 72c (a part in this embodiment) of the outer circumferential part 73. The line guide portion 72e is formed diagonally from the tip part 72a towards the second surface 72d side. The bulged portion 72f is at least a part of the second surface 72d of the outer circumferential part 73 and, in this embodiment, is installed at the tip part 72a, which is a part that opposes the line guide portion 72e. The bulged portion 72f bulges from the second surface 72d so that a boundary portion 72b is formed between bulged portion and the line guide portion 72e. The boundary portion 72b is disposed on the second surface 72d side of the midsection of the first surface 72c and the second surface 72d of the clip body 72. The boundary portion 72b is disposed radially inwards from the outer peripheral surface 4i of the tubular portion 4e.

The length L2 from the tip part 72a of the line guide portion 72e is slightly shorter than the length L1 (L2<L1) from the tip part 72a of the bulged portion 72f. Furthermore, the line guide portion 72e is configured by a flat surface, and the angle α between the line guide portion 72e and the first surface 72c is between 25 degrees and 45 degrees and, preferably, in the range of 30 degrees to 40 degrees. If the angle is in this range, the fishing line can be easily pulled in between the first surface 72c and the sheet member 80. The bulged portion 72f has a top portion 72g that is disposed radially outward from the outer peripheral surface 4i of the tubular portion 4e.

The attachment portion 74 is fixed to the rear surface of the rear flange 4d penetrating the through hole 4h that is formed on the bottom surface 4g by a stud bolt 82.

A plate-like sheet member 80 is attached between the recess 4f and the bottom surface 4g of the first surface 72c of the clip body 72 of the line clip 70. The sheet member 80 is, for example, a synthetic resin with a high slidability, such as polyacetal, etc. Therefore, the fishing line is clamped between the sheet member 80 and the first surface 72c of the clip body 72.

The drag mechanism 60 is attached between the spool 4 and the spool axle 15 and is a mechanism that applies the drag force to the spool 4. The drag mechanism 60 has a knob part 61 for adjusting the drag force manually and multiple drag plates 62 that are pressed to the spool 4 side by the knob part 61.

Next, the reel operation and behavior are explained.

When fishing, in order to release the fishing line from the reel main body 2 by casting, the bale arm 44 is inverted, and the bale arm 44 is put in a line releasing position. in this state, the fishing pole is cast while the index finger of the hand that holds the fishing pole hooks the fishing line. Then, the fishing line will be swiftly released forward due to the weight of the rig. If the handle 1 is rotated in the line reeling direction, the rotor 3 is rotated in the line reeling direction by the rotor drive mechanism 5, the bale arm 44 is returned to the line reeling position by a bale returning mechanism not shown in the drawing, and the fishing line is wound to the spool 4.

When one has finished fishing, the spinning reel 100 is taken off of the fishing pole and the spinning reel 100 is put away, the tip part of the fishing line is hooked to the line clip 70. At this time, by hooking the fishing line with the tip part 72a of the clip body 72 and lifting the tip up, a gap is formed between the clip body 72 and the skirt 4c. And, by sandwiching the fishing line in this gap, the fishing line is clipped by the clip body 72. At this time, since a line guide portion 72e is formed on the first surface 72c side of the clip body 72, picking up the clip body 72 with the fishing line becomes easy, and clipping the fishing line to the line clip 70 becomes easy. Furthermore, since the bulged portion 72f is formed at the tip part of the second surface 72d side of the clip body 72, even if a line guide portion 72e is installed, the thickness of the tip part of the clip body 72 does not become thin. For this reason, even if the operation to pick up the clip body 72 is repeated, the tip part 72a of the clip body 72 will not be prone to plastic deformation.

Additionally, since a bulged portion 72f is installed, and the line guide portion 72e can be made large while maintaining the fishing line retaining force of the line clip 70, the configuration can be simple and inexpensive; plastic deformation is not limited to only the outer circumferential part 73 of the clip body 72 when the fishing line is retained; and plastic deformation can occur more entirely. Therefore, even if a relatively thick fishing line is clipped, the retaining force can be maintained.

Characteristics

The embodiment described above can be expressed as the following.

(A) The spool 4 of the spinning reel 100 is equipped with a bobbin trunk 4a, a front flange 4b, a skirt 4c, and a line clip 70. The bobbin trunk 4a is for winding the fishing line. The front flange 4b is installed on the front part of the bobbin trunk 4a. The skirt 4c has a rear flange 4d that is disposed facing the front flange 4b, a tubular portion 4e that extends backward from the outer circumferential part of the rear flange 4d, and a recess 4f that has a bottom surface 4g that is recessed and formed planarly from the outer peripheral surface in the boundary portion of the rear flange 4d and the tubular portion 4e. The line clip 70 has a clip body 72 and an attachment portion 74. The clip body 72 has a first surface 72c, a second surface 72d, a line guide portion 72e, and a bulged portion 72f. The first surface 72c is a surface that faces the bottom surface 4g. The second surface 72d is the surface that is on the opposite side of the first surface 72c. The line guide portion 72e is formed slanted toward the second surface 72d at the tip part of the first surface 72c. The bulged portion 72f is formed at the tip part of the second surface 72d and bulges from the second surface 72d so that a boundary portion 72b is formed between the bulged portion and the line guide portion 72e. The boundary portion 72b is disposed on the second surface 72d side of the midsection of the first surface 72c and the second surface 72d of the clip body 72. The attachment portion 74 is plate shaped, is integrally formed on the first surface 72c of the clip body 72, and is attached to the rear surface of the rear flange 4d while penetrating the bottom surface 4g.

With this spool 4 of this spinning reel 100, a line guide portion 72e is formed. on the first surface 72c that opposes the bottom surface 4g of the tip part of the line clip 70; at the same time, a bulged portion 72f that is joined with the line guide portion 72e by a boundary portion 72b is formed on the second surface 72d. By installing the bulged portion 72f, the wall thickness of the tip side of the clip body 72 to which the line guide portion 72e is installed can be made to be partially thick. With this, in the clip body 72, plastic deformation at the tip part 72a to which the line guide portion 72e is installed can be suppressed while the generation of elastic deformation is easy, Furthermore, the boundary portion 72b is disposed on the second surface 72d side of, that is, radially outward from, the midsection of the first surface 72c and the second surface 72d of the clip body 72. By positioning the boundary portion 72b on the second surface 72d side of the midsection, inserting the fishing line into the line guide portion 72e, that is, radially outward, and clipping the fishing line becomes easy. With these, plastic deformation can be suppressed, and the clipping of the fishing line becomes easy.

(B) In the spool 4, the boundary portion 72b can be disposed radially inward from the outer peripheral surface 4i of the tubular portion 4e. In this case, since the boundary portion 72b does not protrude from the outer peripheral surface 4i of the tubular portion 4e of the skirt 4c, the fishing line will not be caught by the boundary portion 72b.

(C) In the spool 4, the bulged portion 72f can have a top portion 72g that is disposed radially outward from the outer peripheral surface 4i of the tubular portion 4e. In this case, even if the bulged portion 72f is disposed radially outward from the outer peripheral surface 4i of the tubular portion 4e, the fishing line is not easily caught.

(D) In the spool 4, the line guide portion 72e is configured by a flat surface, and the angle between the line guide portion 72e and the first surface 72c is in the range of 30 degrees to 40 degrees. In this case, since the angle α of the line guide portion 72e is large, the fishing line is easily guided to the line guide portion 72e.

(E) In the spool 4, the tip of the boundary portion 72b is rounded into a circular-arc shape. In this case, since the boundary portion 72b is rounded into a circular-arc shape, the fishing line is not easily damaged.

(F) The spool 4 further comprises a sheet member 80 that is disposed between the first surface 72c and the bottom surface 4g. In this case, by using a highly slidable synthetic resin for the sheet member 80, the guided fishing line can be disposed smoothly between the first surface 72c and the sheet member 80.

Other Embodiments

One embodiment of the present invention was described above; however, the present invention is not limited to the above-described embodiment, and various modifications can be made without departing from the scope of the invention. Specifically, the various embodiments and modified examples described in the present Specification can be freely combined according to necessity.

(a) In the embodiment mentioned above, a spinning reel that has a front drag mechanism was described as an example, but the present invention is not limited to this. For example, the present invention can be applied to all spinning reels, such as a spinning reel having a rear drag mechanism or a spinning reel that has a lever brake mechanism that controls the rotor, etc.

(b) In the embodiment mentioned above, the attaching part of the line clip was fixed to the rear surface of the rear flange 4d, but the present invention is not limited to this. The attaching part can be disposed on the rear surface of the rear flange while in a state where the attaching part is appended radially movable and radially inwardly.

(c) In the embodiment mentioned above, a sheet member 80 was installed, but a sheet member does not need to be installed.

(d) In the embodiment mentioned above, the tubular portion 4e of the skirt 4c had a form that houses the connecting portion 30 of the rotor 3, but the spool of the present invention is not limited to this. The present invention can also be applied to a spool in which the connecting portion of the rotor is housed in the bobbin trunk. In this case, the length of the tubular portion of the skirt in the spool axle direction becomes short.

(e) In the embodiment mentioned above, the length L1 from the tip part 72a of the line guide portion 72e was shorter than the length L2 from the tip part 72a of the bulged portion 72f, but they can be substantially the same.

(f) In the embodiment mentioned above, the outer circumferential part 73 of the clip body 72 is roughly triangular, and a bulged portion and a line guide portion were installed on one part of the outer circumferential part; however, the present invention is not limited to this For example, in the case that the outer circumferential part of the clip body is roughly circular, a line guide portion and a bulged portion can be installed on the entirety of the outer circumferential part. With this attaching the line clip to the spool becomes easy, and at the same time, clipping the fishing line to the line clip becomes easy.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially affect their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A spinning reel line clip comprising:
   an attachment portion configured to be attached to a spool of a spinning reel; and
   a clip body for clipping a fishing line, the clip body attached to the attachment portion, the clip body including:
   a line guide portion formed on at least a part of a first surface of an outer circumferential part of the clip body, the first surface being opposed to the spool; and
   a bulged portion bulging on at least a part of a second surface of the outer circumferential part and in a direction away from the spool so as to maintain a predetermined thickness at a tip part of the second surface, the bulged portion being opposed to the line guide portion, the second surface being oppositely disposed relative to the first surface.

2. The spinning reel line clip as recited in claim 1, wherein the second surface includes a flat surface on at least a part thereof, and
the bulged portion is formed in a shape bulged from the flat surface by a bulging deformation.

3. The spinning reel line clip as recited in claim 1, wherein the outer circumferential part of the clip body is partially spherical shaped, and
the line guide portion and the bulged portion are formed in at least a part of the outer circumferential part.

4. The spinning reel line clip as recited in claim 1, wherein the outer circumferential part of the clip body is triangularly shaped, and
the line guide portion and the bulged portion are formed in at least a corner vicinity of the triangularly shaped outer circumferential part.

5. The spinning reel line clip as recited in claim 4, wherein the corner vicinity is rounded in a circular-arc shape.

6. The spinning reel line dip as recited in claim 1, wherein the bulged portion has a length extending from an end of the outer circumferential part, and the line guide portion has a length extending from the end of the outer circumferential part that is substantially the same as the length of the bulged portion.

7. The spinning reel line clip as recited in claim 1, wherein the bulged portion has a length extending from an end of the outer circumferential part, and the line guide portion has a length extending from the end of the outer circumferential part that is shorter than the length of the bulged portion.

8. The spinning reel line clip as recited in claim 1, wherein the line guide portion has a slope that slants in a direction away from the spool from the first surface to the second surface.

9. The spinning reel line clip as recited in claim 8, wherein the slope is formed by a flat surface that defines an angle in a range of 30 degrees to 40 degrees with respect to the first surface.

10. A spinning reel spool configured to forwardly release a fishing line, the spinning reel spool including the spinning reel line clip recited in claim 1, and further comprising:
    a bobbin trunk for winding the fishing line thereon;
    a front flange disposed on a front part of the bobbin trunk;
    a skirt including a rear flange disposed in opposition to the front flange; and a tubular portion backwardly extended from an outer peripheral part of the rear flange, the tubular portion having an outer peripheral surface with a recess, the spinning reel line clip being attached to a bottom surface of the recess that is recessed from the outer peripheral surface of the tubular portion.

11. The spinning reel spool as recited in claim 10, wherein a boundary portion between the bulged portion and the line guide portion is disposed radially inwards of the outer peripheral surface of the tubular portion.

12. The spinning reel spool as recited in claim 11, wherein the boundary portion is rounded in a circular-arc shape.

13. The spinning reel spool as recited in claim 10, wherein the bulged portion has a top portion disposed radially outwards of the outer peripheral surface of the tubular portion.

14. A spinning reel spool configured to forwardly release a fishing line, the spinning reel spool comprising:

an attachment portion configured to be attached to a spool of a spinning reel;

a clip body for clipping a fishing line, the clip body attached to the attachment portion, the clip body including a line guide portion formed on at least a part of a first surface of an outer circumferential part of the clip body, the first surface being opposed to the spool, and a bulged portion formed on at east a part of a second surface of the outer circumferential part, the bulged portion being opposed to the line guide portion, the second surface being oppositely disposed relative to the first surface;

a bobbin trunk for winding the fishing line thereon;

a front flange disposed on a front part of the bobbin trunk;

a skirt including a rear flange disposed in opposition to the front flange;

a tubular portion backwardly extended from an outer peripheral part of the rear flange, the tubular portion having an outer peripheral surface with a recess, the spinning reel line clip being attached to a bottom surface of the recess that is recessed from the outer peripheral surface of the tubular portion; and a sheet member disposed between the first surface and the bottom surface of the recess.

* * * * *